United States Patent [19]
Lamson

[11] 3,982,638
[45] Sept. 28, 1976

[54] DEVICE FOR CONVERTING PALLETS INTO A STORAGE RACK

[76] Inventor: Frederick W. Lamson, 725 S. Glenhurst Drive, Birmingham, Mich. 48009

[22] Filed: May 17, 1974

[21] Appl. No.: 470,817

[52] U.S. Cl. .................. 214/10.5 R; 108/55.1; 206/386; 211/194
[51] Int. Cl.² ............................................ B65G 1/14
[58] Field of Search ................. 214/10.5 R; 108/55; 211/177, 194, 206; 206/386

[56] References Cited
UNITED STATES PATENTS

| | | | |
|---|---|---|---|
| 2,523,271 | 9/1950 | Bartel | 108/55 |
| 3,277,848 | 10/1966 | Runge | 108/55 |

FOREIGN PATENTS OR APPLICATIONS

| | | | |
|---|---|---|---|
| 1,357,458 | 2/1964 | France | 108/55 |
| 1,105,664 | 3/1968 | United Kingdom | 108/55 |

*Primary Examiner*—L. J. Paperner
*Assistant Examiner*—George F. Abraham
*Attorney, Agent, or Firm*—Frank John Catalano

[57] ABSTRACT

A device for use in stacking pallets in which a pallet spacing assembly adapted for vertical tandem mounting of a similar spacing assembly thereon has secured thereto a pallet support assembly, the support assembly being detachably connectable to the pallet to cantilever the pallet from the spacing assembly, thereby converting the pallet into a storage rack.

7 Claims, 3 Drawing Figures

DEVICE FOR CONVERTING PALLETS INTO A STORAGE RACK

BACKGROUND OF THE INVENTION

This invention relates generally to storage racks and more particularly concerns storage racks for palletized articles.

Many articles of manufacture, and particularly relatively heavy articles produced on a production line basis, are palletized for shipment from the place of manufacture.

Storage of such palletized articles often result in waste of both space and labor. If the articles are left palletized the floor space required for storage, though used only temporarily, is considerable. This storage area requirement can be minimized by the use of permanent storage racks, resulting in a lesser, though permanent, use of space. Further space minimization may be possible by storage without using the pallets, but palletization and depalletization at each relocation of the articles requires a large expenditure of time and labor.

If, on the other hand, the pallets themselves can be converted into temporary storage racks, the storage area required will be both temporary and minimal and depalletization need occur only when the articles are to be used.

It is, therefore, an object of this invention to provide a device useful to convert such pallets into temporary storage racks.

SUMMARY OF THE INVENTION

In accordance with the invention a device for stacking pallets is provided. A pair of upright members are secured in spaced relationship with each other. At least one horizontal member is rigidly fixed to each of the upright members. The horizontal members are adapted to cantilever the pallet from the upright members. Means provided on the upright members will secure a similar pair of upright members, mounted in tandem thereon, against relative lateral motion with respect to each other. Means provided on at least one of the horizontal members permit detachable coupling of the horizontal member to the pallet.

BRIEF DESCRIPTION OF THE DRAWINGS

Other objects and advantages of the invention will become apparent upon reading the following detailed description and upon reference to the drawings, in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
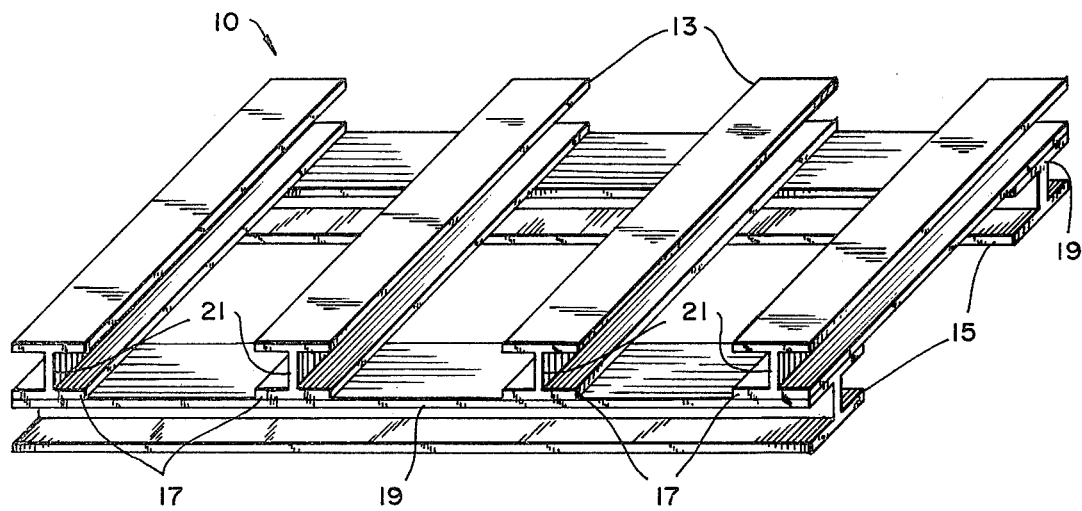
FIG. 1 is a perspective view of a pallet to be converted into a storage rack.

A typical pallet 10 on which articles of manufacture may be mounted for shipment is illustrated in FIG. 1. Such pallets are generally formed by a transverse arrangement of parallel members, such as the upper and lower arrays of I-bars 13 and 15 shown, in which the lower flanges 17 of the upper array I-bars 13 are fixed to the upper flanges 19 of the lower array I-bars 15.

Figure 2:
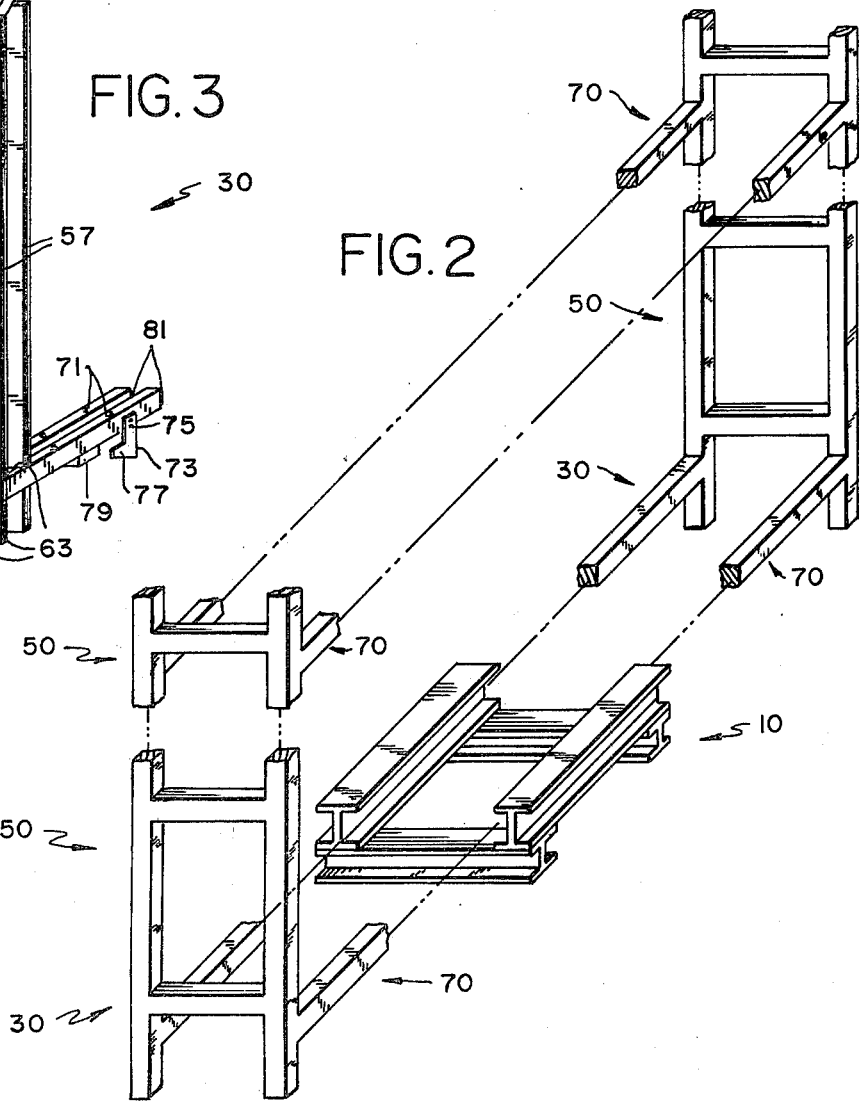
FIG. 2 is a perspective developmental view illustrating the use of several stacking devices to convert several pallets into a storage rack.

Referring to FIG. 2, it can be seen that such a pallet can be converted into a storage rack by use of a pair of stacking devices 30. Each stacking device 30 consists essentially of a pallet spacing assembly 50, adapted so that similar assemblies 50 may be interlocked in a vertical tandem, and a pallet support assembly 70 rigidly secured to the spacing assembly 50 and adapted for detachable rigid connection with the pallet 10.

Figure 3:
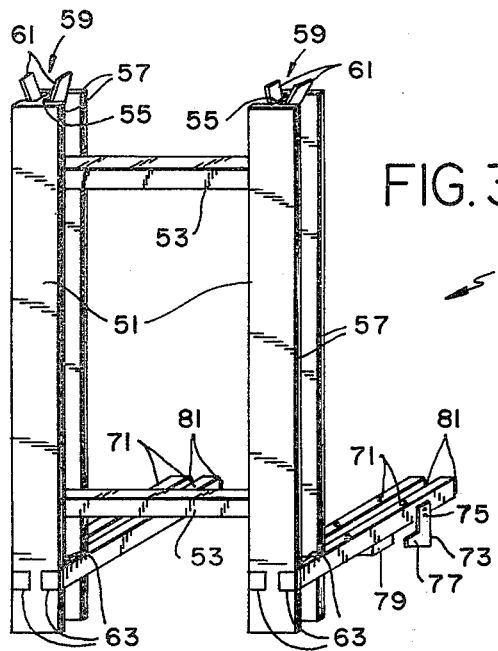
FIG. 3 is a perspective view of a stacking device for use with the pallet illustrated in FIG. 1.

Turning to FIG. 3, the preferred embodiment of the stacking device 30 for use with the particular pallet 10 illustrated in FIG. 1 is shown.

The pallet spacing assembly 50 consists of a pair of upright members 51 secured in spaced relationship by cross-members 53. In the illustrated form, the upright members 51 are I-bars having their webs 55 disposed in parallel face-to-face relationship. The cross-members 53 are horizontally disposed channels having their ends fixed witin the pockets formed by the webs 55 and flanges 57 of the I-bars. The length of the upright members 51 is determined by the height of the articles to be stoved on the pallets 10, as can best be seen in reference to FIG. 2.

To insure a secure vertical tandem arrangement of several stacking devices 30, each upright member 51 is provided at its upper end with a seat 59 adapted to receive the lower end of the upright member which will be mounted above it. As shown, each seat 59 consists of a pair of rectangular plates 61. The lower ends of the plates 61 are secured to the opposite faces of the I-bar web 55 with the upper end of the plates 61 extending above the upper end of the I-bar. Thus, when the lower end of the next vertical tandem I-bar is rested on the upper end of its predecessor, its web 55 will be interposed in the seat 59. Ideally, the width of the plates 61 will be substantially equal to the width of the I-bar webs 55. The upper portion of the plates 61 then cooperates with the web and flanges of the added I-bar to secure the I-bars against relative lateral motion. As shown, the upper ends of each pair of plates 61 may be outwardly tapered or diverge from the respective webs to facilitate interposition of the webs of a similar pair of I-bars during the stacking process.

The pallet support assembly 70 consists of an arrangement of horizontal members 71 rigidly secured near the lower end of the pallet spacing assembly 50 and extending transversely therefrom. The support assembly 70 illustrated in FIG. 3 is adapted for use with the pallets 10 shown in FIG. 1. Two pairs of elongated members 71 having a rectangular cross-section are employed. Each pair is parallelly disposed and spaced so that the web 21 of an upper pallet I-bar 13 is insertable therebetween. The downward faces of the top flanges of the upper pallet I-bar 13 will therefore rest on the top faces of a pair of elongated members 71. The pallet I-bar web 21 cooperates with the inside faces of the elongated members 71 to prevent relative transverse motion of the pallet 10 with respect to the horizontal members.

In addition, one or more of the elongated members 71 may be provided with a locking means to secure the pallet 10 against forward or rearward motion with respect thereto. For example, in the case of the I-bar pallets 10 above described a rotating catch 73 may be mounted on the outer side face of one of the elongated members 71. The catch 73 may consist of a radial arm 75 extending beneath the bottom face of the elongated member 71 from which a lug 77 integrally extends toward the spacing assembly 50. Also provided on the bottom face of the elongated member 71 and more proximate the spacing assembly 50 than the catch 73 is a stop member 79. As the elongated member 71 is inserted in the slot formed by the web and flanges of the upper pallet I-bar 13, the leading edge of the catch 73 strikes the leading portion of the top flange 19 of the lower pallet I-bar 15. This impact rotates the catch 73 approximately 360°, causing the arm 75 and the lug 77 to engage the trailing portion of the top flange 19 of the lower pallet I-bar 15. Simultaneously, the leading face of the stop member 79 moves into abutment with the leading portion of the top flange 19 of the lower pallet I-bar 15. The stop member 79 and the catch 73 then cooperate with the flange to secure the pallet 10 against forward or rearward motion with respect to the elongated member 71.

It should be noted that the use of I-bars as upright members 51 facilitates securing the elongated members 71 to the spacing assembly 50. Notches 63 may be provided in the I-bar flanges from which the elongated members 71 may be cantilevered at one end. The web 55 of the upright member 51 will thus serve as a spacer between a pair of elongated members 71, providing the gap necessary to insert the pallet I-bar web 21 therebetween.

Additionally, the leading edges 81 of the elongated member 71 may be bevelled to facilitate insertion into the pallet I-bar 13.

Finally, it should be noted that both the spacing assembly 50 and the support assembly 70 may be made of a relatively light weight, rigid material such as aluminum or magnesium. Therefore the stacking device 30 can be easily manually handled.

In operation, several pairs of stacking devices 30 are secured to opposite sides of several pallets 10 by sliding the elongated members 71 into the upper pallet I-bars 13 until the stop member 79 and the catch 73 engage a lower pallet I-bar 15. Each such cantilevered arrangement may now be stacked above a preceding one by raising it above the preceding one and setting the lower ends of its upright members 71 into the seats 59 on the upper ends of the corresponding upright members 71 of the preceding arrangement.

Raising and lowering of the cantilevered arrangements can easily be accomplished by use of fork lift truck, and it should be obvious that articles may be conveniently stored without ever removing them from the pallets 10 on which they are transported.

To disassemble a stack the catch 73 may be manually released and the process reversed. The stacking devices 30 may then be stored in an area relatively small in comparison to the area that would have been taken by a permanent stacking arrangement serving the same purpose.

Thus it is apparent that a pallet stacking device has been provided that fully satisfies the objects, aims and advantages set forth above. While the invention has been described in conjunction with a specific embodiment thereof, it is evident that many alternatives, modifications and variations will be apparent to those skilled in the art in the light of the foregoing description. Accordingly, it is intended to embrace all such alternatives, modifications and variations as fall within the spirit and scope of the appended claims.

What is claimed is:

1. For use in stacking pallets formed by fixing the lower flange faces of a first array of parallel, horizontal I-bars to the upper flange faces of a second array of parallel, horizontal I-bars transverse to the first, a device comprising:
    a pair of upright I-bars rigidly secured in parallel spaced relationship with their webs face-to-face;
    a first pair off parallel, horizontal members rigidly fixed at one end to one of said upright I-bars proximate its lower end, said first pair of horizontal members being spaced to receive the web of one of the pallet first array I-bars therebetween with the lower faces of the upper flange of said first array I-bar resting on the upper faces of said first pair of horizontal members;
    a second pair of parallel, horizontal members rigidly fixed at one end to the other of said upright I-bars proximate its lower end, said second pair of horizontal members being spaced to receive the web of another of the pallet first array I-bars therebetween with the lower faces of the upper flance of said other first array I-bar resting on the upper faces of said second pair of horizontal members;
    means on said upright I-bars for securing a similar pair or upright I-bars mounted in tandem thereon against relative lateral motion with respect to said upright I-bars; and
    means on at least one of said horizontal members for detachably coupling said one of said horizontal members to the pallet.

2. The device according to claim 1, said securing means comprising:
    a first pair of rectangular plates, spaced face-to-face and fixed at their lower portions to the web of one of said upright I-bars disposed therebetween, the upper portions of said plates extending above the upper end of said one of said upright I-bars; and
    a second pair of rectangular plates similarly disposed on the other of said upright I-bars.

3. The device according to claim 2, said upper portions of each of said pairs of plates diverging from the webs of said upright I-bars to which they are respectively fixed.

4. The device according to claim 1, said coupling means comprising:
    a stop member secured to the lower face of one of said horizontal members for abutment with the leading edge of the upper flange of one of the pallet second array I-bars when said first array I-bars are inserted between said pairs of horizontal members; and
    a catch, rotatively journaled on the outer side face of the horizontal member to which said stop member is secured, for detachable engagement with the trailing edge of the upper flange of said one of the pallet second array I-bars when said stop member abuts the leading edge thereof;
    said stop member being cooperable with said catch to secure the pallet against axial movement relative to said horizontal members.

5. The device according to claim 1 further comprising four pair of notches in the flanges of said upright I-bars, one pair of said notches being aligned face-to-face on each side of the webs of each of said upright members, the cross-section of said notches being equal to the cross-section of said horizontal members so that members may be rigidly secured therein.

6. The device according to claim 5, the width of the webs of said upright I-bars being not less than the width of the pallet first array I-bars so that the webs of said upright I-bars serve as spacers between the members of their respective pairs of horizontal members.

7. The device according to claim 1, the ends of said horizontal members not fixed to said upright I-bars being bevelled.

* * * * *